UNITED STATES PATENT OFFICE.

FRANCIS ARTHUR FREETH, OF GREAT CROSBY, AND HERBERT EDWIN COCKSEDGE, OF LONDON, ENGLAND.

PROCESS OF MAKING AMMONIUM CHLORID.

970,909. Specification of Letters Patent. Patented Sept. 20, 1910.

No Drawing. Application filed January 17, 1910. Serial No. 538,564.

*To all whom it may concern:*

Be it known that we, FRANCIS ARTHUR FREETH and HERBERT EDWIN COCKSEDGE, subjects of the King of Great Britain, residing at Great Crosby, in the county of Lancaster and London, respectively, both in the Kingdom of England, have invented certain new and useful Improvements in the Manufacture of Ammonium Chlorid from Ammonium Sulfate and Common Salt, of which the following is a specification.

Our process consists in stirring together at a temperature of 103° C. or thereabout, equivalent quantities of sodium chlorid and ammonium sulfate mixed with that quantity of water which just suffices to yield, after completion of the reaction, a solution saturated with regard to ammonium chlorid and sodium sulfate at 103° C. or thereabout, until the reaction is complete, that is, until the whole of the sodium chlorid is transformed into ammonium chlorid. We then separate by any well known means and at the temperature of the reaction, the sodium sulfate precipitated. To the liquor remaining after the separation, we add a small quantity of water, or saturated or partially saturated ammonium chlorid solution, preferably wash-water from a previous operation, amounting to less than 4 per cent. of the total volume of the liquid, and then cool to 30° C. or thereabout, when we obtain a large yield of ammonium chlorid which is separated from the liquor by any well known means, and washed with water or ammonium chlorid solution to remove adhering mother liquor. It is then free, or practically free from sodium sulfate and other salts, and may be drained or dried as required. The precipitated sodium sulfate is washed until free from adherent mother liquor, and is then also practically pure. The mother liquor remaining after separation of the ammonium chlorid may be used over again for a fresh operation after the required equivalent quantities of sodium chlorid and ammonium sulfate have been added.

We may in our process above described, employ, instead of solid sodium chlorid, a solution of sodium chlorid in water, for instance natural brine, either purified or unpurified, and after addition of the equivalent quantity of ammonium sulfate, evaporate the mixture before separation of the sodium sulfate precipitated, until it is saturated at 103° C. or thereabout as regards ammonium chlorid and sodium sulfate.

If after a series of operations it is found necessary to renew the liquor because of accumulation of impurities, or for other reasons, we may proceed as follows: After cooling to 30° C. and separating the ammonium chlorid as above described, the mother liquor is concentrated until it is just saturated at 103° C. with respect to ammonium chlorid. The sodium sulfate thrown out by the concentration is removed, and the liquor after addition of a small quantity of water is cooled to 30° C. to separate ammonium chlorid. By repeating this operation the ammonium chlorid may be separated from the liquors to any desired extent, and the ammonia remaining in the final liquors may be recovered by distillation with alkali or otherwise.

Example: About 97 parts of ammonium sulfate, 86 parts of sodium chlorid, and 100 parts of water are stirred at 103° C. until the reaction is complete, which may require an hour or more. The precipitated sodium sulfate is now removed, care being taken that the temperature does not fall during the operation: to the hot mother liquor is then added about 6 parts of water or ammonium chlorid solution, and the whole is then cooled to 30° C.: the ammonium chlorid is separated, washed and drained or dried in the usual way.

We declare that what we claim is:—

1. The process for manufacturing pure, or nearly pure, ammonium chlorid, from ammonium sulfate and common salt, which consists in stirring together at a temperature of 103 degrees centigrade, or thereabout, equivalent quantities of ammonium sulfate and sodium chlorid with just sufficient quantity of water to yield after the reaction is completed a solution which is saturated with both ammonium chlorid and sodium sulfate at the temperature at which the reaction was performed, continuing the stirring at 103 degrees centigrade or thereabout, until the whole of the sodium chlorid has been converted into ammonium chlorid; separating at that same temperature the sodium sulfate precipitated, adding to the solution remaining a small quantity of water, and then cooling to about 30 degrees centigrade, and at this temperature separating the ammonium chlorid which precipitates, and washing the same with water or ammonium chlorid solution to remove the adhering mother liquor.

2. The process of obtaining pure, or nearly pure, ammonium chlorid from ammonium sulfate and sodium chlorid, which consists in stirring together at a temperature of 103 degrees centigrade a mixture of these salts with water in the proportion of 97 parts of ammonium sulfate, 86 parts of sodium chlorid, and 100 parts of water until the whole of the sodium chlorid is converted into ammonium chlorid, then separating the sodium sulfate at that temperature, adding to the solution remaining a little water, cooling to 30 degrees centigrade and separating the ammonium chlorid thus precipitated.

3. The process for manufacturing pure or nearly pure ammonium chlorid from ammonium sulfate and common salt, which consists in stirring together at a temperature of about 103° centigrade, equivalent quantities of ammonium sulfate and sodium chlorid with water, the two latter being in the form of natural brine, and evaporating the mixture until the concentration of the solution is such that it is just saturated with ammonium chlorid and sodium sulfate at the temperature at which the reaction was performed and was completed, continuing the stirring at 103° centigrade or thereabout until the whole of the sodium chlorid has been converted into ammonium chlorid, separating at the same temperature the sodium sulfate precipitated, adding to the solution remaining a small quantity of water and then cooling to about 30° centigrade and at this temperature separating the ammonium chlorid which precipitates, and washing the same with water or ammonium chlorid solution to remove the adhering mother liquor.

4. The process of recovering ammonia from impure mother liquor produced in the manufacture of ammonium chlorid from ammonium sulfate and common salt, which consists in concentrating the mother liquor from which the ammonium chlorid has been separated at 30° centigrade or thereabout, until it is just saturated with ammonium chlorid at a temperature of 103° centigrade or thereabout, removing at that temperature the sodium sulfate thrown out by the concentration, adding to the solution remaining a small quantity of water, and then cooling it to 30° centigrade or thereabout, separating the ammonium chlorid precipitated at that temperature, washing the same to remove the adhering mother liquor, and repeating this cycle of operations as often as may be necessary.

In witness whereof, we have hereunto signed our names this 7th day of January 1910, in the presence of two subscribing witnesses:

FRANCIS ARTHUR FREETH.
HERBERT EDWIN COCKSEDGE.

Witnesses:
CHARLES LESLIE,
RICHARD W. WILLIAMS.